United States Patent Office 2,980,390
Patented Apr. 18, 1961

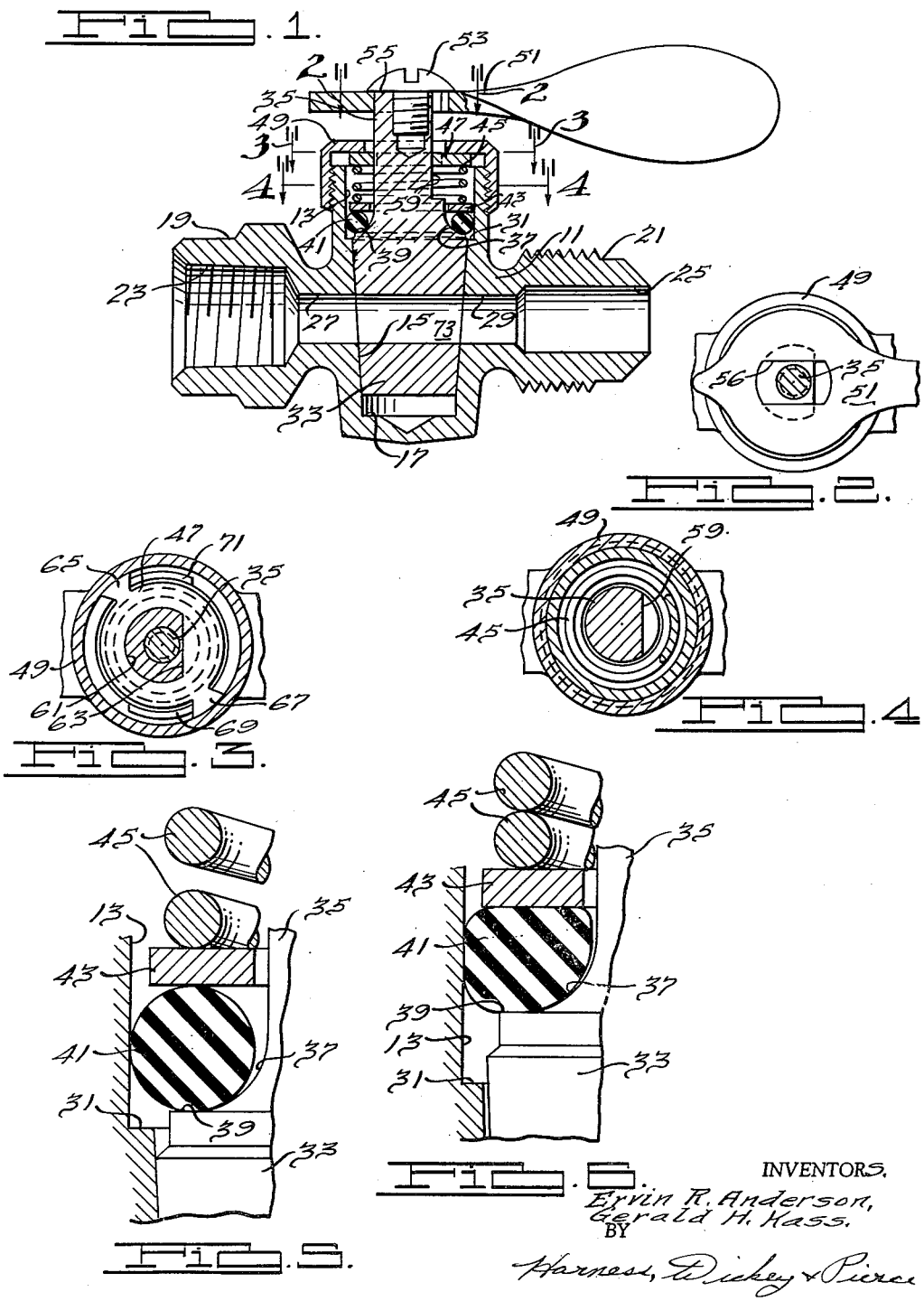

2,980,390

ROTARY VALVE

Ervin R. Anderson, Lincoln Park, and Gerald H. Kass, Garden City, Mich., assignors to Anderson Brass Company, Detroit, Mich., a corporation of Michigan Filed Jan. 2, 1958, Ser. No. 706,667

4 Claims. (Cl. 251—181)

The present invention relates to valves, and more particularly to an improved sealing means for valves.

The preferred embodiment of the present invention is illustrated in the form of a shut off cock which is interposed in a fluid conduit for manually opening or closing the flow. The valve is of the type utilizing a tapered valve element seated against a correspondingly tapered valve seat and held in engagement therewith by means of a compression spring. An aperture is provided transversely through the valve element, which is rotatable into and out of alignment with passages leading to the line.

Valves of such a construction are subject to occasional high pressure build ups in the line, which operate to disengage the valve element from the valve seat. Various types of secondary seals have been utilized between the valve stem and valve body to prevent the escape of fluid from the valve under such circumstances. However, the commercially successful types of sealing means heretofore commonly utilized have been in the nature of compressed packings tightly engaging both the valve stem and the body, and have the disadvantage of tending to retard the receding of the valve when the high pressure subsides. It is an object of the present invention to provide a valve of the type described having an improved secondary sealing construction which will not only avoid undesirable obstruction or suspension of the valve element when the same is displaced from its seat, but will positively aid in returning the valve element to its proper seated position as soon as the fluid pressure permits.

It is a further advantage of the present invention to provide a valve having sealing means which increases its sealing effectiveness as the pressure of the fluid trying to escape from the valve increases.

It is a still further object of the present invention to provide a valve sealing structure which is inexpensive to manufacture, easily assembled, and dependable in operation.

Other objects and advantageous features of novelty of the invention will be specifically pointed out or otherwise become apparent when referring, for a better understanding of the invention, to the following description taken in conjunction with the accompanying drawings, wherein:

Figure 1 is a sectional view of a valve assembly incorporating the structure of the present invention;

Fig. 2 is a broken sectional view of the structure shown in Fig. 1 taken along the line 2—2 thereof;

Fig. 3 is a broken sectional view of the structure shown in Fig. 1 taken along the line 3—3 thereof;

Fig. 4 is a broken sectional view of the structure shown in Fig. 1 taken along the line 4—4 thereof;

Fig. 5 is an enlarged view of a portion of the structure shown in Fig. 1; and

Fig. 6 is a view of the structure shown in Fig. 5 with the valve element displaced from its seat.

Referring to the drawings, Fig. 1 illustrates a valve or shut off cock embodying the features of the present invention, and includes a valve body or casing 11 having an upper chamber 13 and a lower chamber defined by a valve seating surface 15 and bottom surface 17. Projecting from opposite sides of the valve body 11 are bosses 19 and 21 having coaxial ports 23 and 25 communicating with coaxial passages 27 and 29, respectively. The aligned passages, in turn, extend through the valve seat 15, thereby providing continuous comunication between ports 23 and 25. The boss 19 is internally threaded in its ports 23 for reception of a male coupling, while boss 21 is externally threaded for reception of a femal coupling. It will thus be seen that the valve body 11 may be coupled into a fluid conduit so that fluid may enter one of the ports 23 and 25, pass through passages 27 and 29 in the valve body 11 and exit from the other of said ports. Boss 19 is provided with an external hexagonal periphery for engagement by a wrench in the installation or removal of the valve.

The upper chamber 13 of the valve body 11 is of greater diameter than the valve seat 15 and an annular shoulder 31 is disposed between them. The valve seat 15 is of a frustro-conical configuration, having one diameter at the shoulder 31 and tapering to a smaller diameter at its bottom. Engaging the valve seat 15 along substantially its entire length is a tapered valve element 33 having a cylindrical stem 35 extending upwardly through and above the upper chamber 13. The stem 35 is joined to the valve element 33 at a filet 37 which extends from the periphery of the valve stem 35 to a flat annular shoulder 39 disposed on the top of the valve element 33.

The shoulder 39 and a portion of the filet 37 form a seat for sealing engagement by an O-ring 41 which may be of conventional character, comprising an elastic rubber or rubber-like torus. The O-ring is disposed around the valve stem 35, but is of sufficient diameter not to engage it. The outer periphery of the O-ring 41 additionally seals against the cylindrical wall defining chamber 13. Resting on the O-ring 41 is a loose fitting washer 43, which is urged against the O-ring 41 by a helical spring 45 mounted around the valve stem 35. Holding the spring 45 in compression is a washer 47 and a centrally apertured cap 49 which is threaded down on the top of the valve body. The valve stem 35 projects upwardly through the cap 49 for engagement by a handle 51 held thereto by a screw 53.

The upper periphery 55 of the valve stem 35 and an aperture 56 formed in the handle 51 are provided with matching noncylindrical configurations for co-rotational mounting of the handle 51 on the valve stem 55. Also, the valve stem 35 has a flattened wall 59 formed along a substantial portion of its length. The hole 61 of the washer 47 has a flat side 63 conforming to the flat wall 59 which serves to prevent rotation of the washer 47 relative to the valve stem 35. Opposite radially extending projections 65 and 67 on the washer 47 are engageable with oppositely disposed stop lugs 69 and 71 extending upwardly from the valve body 11. Abutment of the projections 65 and 67 with the lugs 69 and 71 serves to limit rotation of the valve element 33 to the distance between the lugs 69 and 71, which is provided to be 90°. Thus, rotation of the handle 57 the full limit of its movement will move the valve from a fully closed to a fully opened position and from a fully open to a fully closed position.

Transmission of fluid through the valve is permitted by the provision of a transverse aperture 73 extending through the valve element or plug 33 so as to align with passages 27 and 29. Fig. 1 illustrates the valve in its open position. The valve is manually closeable by turning the handle 57 ninety degrees so as to position the aperture 73 wholly out of communication with the passages 27 and 29. So long as the valve element 33 bears securely against its seat 15, flow will be entirely prevented from flowing through the valve or escaping to the outside.

While the entire sealing operation is generally accomplished by the engagement of the valve element 33 with its seat 15, it occasionally happens that a large degree of fluid pressure will build up in the conduit in which the valve is connected. Under service conditions, as is well known, a sufficiently high pressure will sometimes overcome the force of the spring 45 and displace the valve element 33 from its seat. If such occurs secondary sealing means must be present to prevent the escape of the fluid, to the outside atmosphere. In our improved construction the O-ring and its associated structure cooperate in a novel and positive manner to effectively seal off the escape of the fluid under such circumstances.

When the valve element 33 is properly seated the arrangement of parts will be as illustrated in Fig. 5, and the O-ring bears relatively lightly against the sealing surfaces so that it creates little resistance to actuation of the valve. However when the valve element is displaced from its seat to compress the spring 45 to its full limit, the arrangement of parts will be that shown in Fig. 6. The upward movement of the valve element 33 compresses the O-ring 41 and increases the pressure of its sealing engagement. The greater the upward pressure, the firmer this sealing engagement will be, and the greater area the seal will cover, and while direct fluid pressure on the bottom of the O-ring might conceivably flatten it to such extent as to drive its inner periphery inwardly against the stem as well as forcing its outer periphery more tightly against wall 13, the inner periphery of the O-ring will immediately move away from the stem as soon as the overpressure subsides. Normally, however, the O-ring 41 never engages the vertical periphery of the stem and the design is preferably such that even at full spring compression the O-ring is still free of the stem, as shown in Fig. 6. With this arrangement the O-ring cannot tend to hold the valve element in the raised position after the higher pressure has subsided. Instead, the O-ring constantly bears downwardly against the annular shoulder 39, urging the valve element 33 to it proper seated position and aiding in returning it quickly and positively to such position.

What is claimed is:

1. In a tapered plug cock having a body with a tapered internal wall defining a chamber therein and a plug member including a plug section normally seated in and rotatable in said chamber and an actuating stem section extending outwardly from the plug section, spring means surrounding the stem for urging the plug section into the chamber, means for maintaining a seal between the body and the plug including an annular shoulder on the plug member surrounding the stem section, an elastic annulus interposed between said spring means and said shoulder and having its inside diameter spaced from the periphery of the stem, and a substantially cylindrical wall sealed with respect to the body and sealingly engaged by the outside diameter of said annulus, said spring means urging said annulus against said shoulder, thereby urging the plug section into the chamber.

2. In a tapered plug cock having a body with a tapered internal wall defining a chamber therein and a plug member including a plug section normally seated in and rotatable in said chamber and an actuating stem section extending outwardly from the plug section, spring means surrounding the stem for urging the plug section into the chamber, means for maintaining a seal between the body and the plug including an annular shoulder on the plug member surrounding the stem section, an elastic annulus interposed between said spring means and said shoulder and having its inside diameter free of the stem when normally seated against said shoulder, and a substantially cylindrical wall sealed with respect to said body and sealingly engaged by the outside diameter of said annulus, said spring means urging said annulus against said shoulder, thereby urging the plug section into the chamber.

3. In a tapered plug cock having a body with a tapered internal wall defining a chamber therein and a plug member including a plug section normally seated in and rotatable in said chamber and an actuating stem section extending outwardly from the plug section, spring means surrounding the stem for urging the plug section into the chamber, means for maintaining a seal between the body and the plug including an annular shoulder on the plug member surrounding the stem section, a rubber-like torus interposed between said spring means and said shoulder and having its inside diameter spaced from the periphery of the stem, and a substantially cylindrical wall sealed with respect to the body and sealingly engaged by the outside diameter of said torus, said spring means urging said torus against said shoulder, thereby urging the plug section into the chamber.

4. In a tapered plug cock having a body with a tapered internal valve seat defining a chamber therein and a plug member including a tapered plug section normally seated against said valve seat and an actuating stem section extending outwardly from the plug section, spring means surrounding the stem for urging the plug section against the valve seat, means for maintaining a seal between the body and the plug including an annular shoulder on the plug surrounding the stem section, a fillet portion joining said shoulder and the stem section, an elastic torus held against said shoulder by said spring means and having an inside diameter greater than the diameter of the stem, and a substantially cylindrical wall sealed with respect to the body and sealingly engaged by the outside diameter of said torus, whereby displacement of the plug member from the valve seat and against said spring means operates to compress said elastic torus into greater area contact with the plug member and said fillet portion.

References Cited in the file of this patent

UNITED STATES PATENTS

| | | |
|---|---|---|
| 2,035,762 | Roberts | Mar. 31, 1936 |
| 2,492,151 | Holm | Dec. 27, 1949 |
| 2,892,610 | Graham | June 30, 1959 |

FOREIGN PATENTS

| | | |
|---|---|---|
| 196,706 | Great Britain | May 1, 1923 |
| 118,800 | Australia | Aug. 9, 1944 |

UNITED STATES PATENT OFFICE

CERTIFICATE OF CORRECTION

Patent No. 2,980,390                              April 18, 1961

Ervin R. Anderson et al.

It is hereby certified that error appears in the above numbered patent requiring correction and that the said Letters Patent should read as corrected below.

Column 1, line 36, for "receding" read -- reseating --.

Signed and sealed this 14th day of November 1961.

(SEAL)
Attest:

ERNEST W. SWIDER
Attesting Officer

DAVID L. LADD
Commissioner of Patents
USCOMM-DC